United States Patent [19]

Lin

[11] Patent Number: 4,492,586

[45] Date of Patent: * Jan. 8, 1985

[54] DYESTUFFS AND DYEING METHOD USING LIGNIN ADDUCT DISPERSANT

[75] Inventor: Stephen Y. Lin, Wausau, Wis.

[73] Assignee: Reed Lignin, Inc., Greenwich, Conn.

[ * ] Notice: The portion of the term of this patent subsequent to Nov. 16, 1999 has been disclaimed.

[21] Appl. No.: 277,225

[22] Filed: Jun. 25, 1981

Related U.S. Application Data

[62] Division of Ser. No. 123,696, Feb. 22, 1980, Pat. No. 4,308,203.

[51] Int. Cl.³ .................. D06P 67/00; C07G 1/00
[52] U.S. Cl. .................................. 8/528; 8/557; 8/589; 8/611; 8/613; 8/650; 8/662
[58] Field of Search ............... 260/124 R; 8/589, 611, 8/528, 613, 557, 650

[56] References Cited

U.S. PATENT DOCUMENTS

| | | | |
|---|---|---|---|
| 3,347,842 | 10/1967 | Meinychyn | 106/123 R |
| 3,388,061 | 6/1968 | Markham | 252/8.5 |
| 3,546,197 | 12/1970 | Benko | 106/124 R |
| 3,769,272 | 10/1973 | Hintz | 260/124 R |
| 3,891,887 | 10/1974 | Falkehag et al. | 106/123 LC |
| 3,956,261 | 5/1976 | Lin | 260/124 R |
| 4,001,202 | 1/1977 | Dilling et al. | 260/124 R |
| 4,017,475 | 4/1977 | Ludwig | 260/124 R |
| 4,184,845 | 1/1980 | Lin | 260/124 R |
| 4,359,321 | 11/1982 | Lin | 8/528 |

*Primary Examiner*—Allan Lieberman

[57] ABSTRACT

Dispersants, especially well suited for use with insoluble dyes, are produced by reacting hydroxyl benzyl alcohol compounds with sulfonated lignin derivatives. The dispersants have high levels of heat stability, coupled with desirable dye reduction, staining, foaming, milling and viscosity-reducing properties. Dyestuffs, dye pastes and dye baths, as well as methods utilizing them, are provided.

8 Claims, No Drawings

DYESTUFFS AND DYEING METHOD USING LIGNIN ADDUCT DISPERSANT

This is a division of application Ser. No. 123,696, filed Feb. 22, 1980 and now U.S. Pat. No. 4,308,203.

BACKGROUND OF THE INVENTION

This invention concerns sulfonated lignin derivative dispersants and, more particularly, the use of such dispersants in dyeing formulations and methods.

As used herein, the term "lignin" has its normal connotation, and refers to the substance which is typically recovered from alkali paper pulping black liquors, such as are produced in the Kraft, soda and other well-known alkali pulping operations. The term "sulfonated lignin", as used in this specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of paper, and is a principal constituent of the spent sulfite liquor which is derived from that process. Finally, the phrase "sulfonated lignin material" encompasses not only the lignin and lignosulfonate reaction products hereinabove described, but also spent sulfite liquors, which materials may be further reacted (such as for methylolation and/or desugaring), purified, fractioned, or the like, as may be appropriate for the particular material involved, and as will be more fully discussed hereinbelow.

It is well know that sulfonated lignin materials may be utilized to considerable advantage as dispersing agents for numerous products such as clays, insecticides, pesticides, dyestuffs, etc. The provision, however, of a satisfactory dyestuff dispersant represents a particularly difficult task, in view of the fact that it must exhibit a desirable balance of properties, some of which are generally found to be inconsistent with others. Accordingly, it is usually necessary to compromise, and to accept a relatively poor level of performance in one or more respects, in order to achieve good performance levels in other respects. In a disperse or vat dye dispersant, for example, the ideal dispersing agent would exhibit excellent heat stability, coupled with low azo dye reducing and staining properties. It should also minimize foaming, afford maximum milling efficiency (i.e., produce small particle sizes in minimum periods of time), and it should furthermore reduce the viscosity of the dye paste in which it is ultimately employed.

As an example of the fundamental inconsistency of certain of the foregoing objectives, which has heretofore been fully appreciated, sulfonated lignin products exhibit excellent high temperature stability, but also tend to stain and to produce high levels of azo dye reduction. Conversely, the lignosulfonates exhibit relatively low levels of azo dye reduction, but are deficient from the standpoint of adequate heat stability, for many applications. In general, it has been found that milling efficiency and heat stability are inconsistent properties, and that a dispersant which exhibits one of them will generally tend to be rather deficient, insofar as the other is concerned. Finally, while the lignosulfonate products generally have a somewhat lower tendency to stain fabrics to which they are applied, as compared to the sulfonated lignin products, in the final analysis none of the lignin based dispersants presently available, or disclosed in the art, exhibit a level of staining which is entirely satisfactory.

In view of the fact that most disperse and vat dyes are either quinone or azo dyes, the need to avoid reduction reactions is particularly important, since the failure to do so results in the need to utilize unduly large amounts of the dye to compensate for the reduction caused by the dispersant. Many attempts have been made in the art to improve the azo dye reducing and staining properties of sulfonated lignin dispersants, which attempts have generally taken the route of blocking the free phenolic hydroxyl groups of the lignin. Exemplary of such attempts are those described in U.S. Pat. Nos. 3,672,817, 3,763,139, 3,769,272, and 3,865,803. While the foregoing methods are somewhat effective, they tend to be rather costly to carry out, and the results achieved are still less than satisfactory.

Similarly, in view of the need to provide good high temperature or heat stability, so as to enable the utilization of the dyestuff in current conventional dyeing procedures, attempts have been made to improve that property in lignosulfonate products. Typical of such attempts is that which is set forth in U.S. Pat. No. 3,864,276, which describes a dispersant obtained by crosslinking spent sulfite liquor solids and Kraft liquor solids. Ultrafiltration, which may be followed by desulfonation of the product, has also been attempted in order to improve heat stability, and several products made in accordance with such techniques are commercially available. Oxidation and desulfonation of spent sulfite liquor, in an alkaline medium with air or oxygen (as in vanillin production), is yet another approach which has been utilized in an effort to improve heat stability of lignosulfonate products. However, all of the foregoing methods invariably darken the lignosulfonate, thereby elevating the level of staining which is produced when they are utilized; such treatments also tend to increase the azo dye reducing propensity of the product. These results, moreover, are accompanied by less than satisfactory improvement in the high temperature stability characteristics of the products involved.

Accordingly, it is the primary object of the present invention to provide novel dispersants produced from sulfonated lignin materials.

It is a more specific object of the invention to provide such dispersants which exhibit an optimal balance of properties, rendering them highly suited for use as dispersants for disperse and vat dyestuffs.

Another specific object of the invention is to provide sulfonated lignin product dispersants which exhibit relatively low staining and azo dye reducing properties, and to provide lignosulfonate dispersants exhibiting greatly improved levels of heat stability.

Yet another object of the invention is to provide dispersants from sulfonated lignin materials, which afford superior milling efficiency, as compared to similar dispersants of the prior art.

Still another object of the invention is to provide novel dispersants of the foregoing sort, which are relatively inexpensive and simple to produce.

Additional objects of the invention include the provision of dyestuff compositions, pastes, and dye baths based upon dispersants of the foregoing type, and to provide methods for their utilization.

SUMMARY OF THE DISCLOSURE

It has now been found that certain of the foregoing and related objects of the present invention are readily attained in a lignin adduct of a sulfonated lignin material containing about 2-8 percent by weight of organic sulfur, and about 0.05-4.0 milimoles, per gram of lignin in the material, of an hydroxyl benzyl alcohol compound. The hydroxyl benzyl alcohol compound has the general formula:

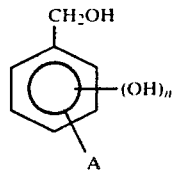

wherein n is an integer from 1-3, and A is a substituent selected from the group consisting of hydrogen, lower alkyl (i.e., containing 1-4 carbon atoms) groups and the hydroxymethyl group.

In certain embodiments, the composition will utilize a lignosulfonate as the lignin material, which lignosulfonate may desirably be a methylolated derivative. In accordance with other embodiments, the lignin material employed will be a sulfonated lignin. In either case, the alcohol compound utilized will preferably be monohydroxyl benzyl alcohol, prepared in an amount of at least about 0.5 millimole per gram of lignin.

Certain objects of the invention will be attained in a method for the production of a alignin adduct, comprising, as a first step, forming an aqueous reaction mixture of a sulfonated lignin material and an hydroxyl benzyl alcohol compound, the latter having the general formula described hereinabove, and being utilized in the same proportion to the lignin as was also hereinabove specified. A temperature of about 50° to about 100° Centigrade and a pH of about 3-12 are established in the reaction mixture to effect reaction between the lignin material and the alcohol compound. Those conditions are maintained in the reaction mixture for a period of about 1-24 hours, so as to substantially convert the lignin material and the alcohol compound to a lignin adduct.

In accordance with a preferred embodiment of the method, the lignin material employed is a spent sulfite liquor, which may be prereacted to effect methylolation of a substantial portion of the lignin-containing constituents thereof; most desirably the methylolation reaction is effected with formaldehyde. It may be especially preferred, in any event, to utilizing a spent sulfite liquor which has been at least partially desugared.

In accordance with an alternative preferred embodiments of the method, the sulfonated lignin material is an alkali lignin sulfonated to an organic sulfur content of about 2-7 percent, by weight.

In all of the foregoing methods, the alcohol compound employed is desirably selected from the group consisting of monohydroxyl benzyl alcohol, dihydroxyl benzyl alcohol, trihydroxyl benzyl alcohol, monohydroxyl methyl benzyl alcohol and monohydroxyl hydroxymethyl benzyl alcohol; most desirably, monohydroxyl benzyl alcohol will be employed to produce the adduct in accordance with the foregoing method. The provision of the lignin adduct, produced by the foregoing method, achieves certain objects of the invention.

Additional objects of the invention are readily attained in a dyestuff composition which comprises a water-insoluble dye and a lignin adduct having the composition, or produced in accordance with the method, hereinabove described. In such a dyestuff composition, the adduct will be present in a weight ratio to the dye of about 0.25-0.75:1.0. The dye will preferably be selected from the group consisting disperse and vat dyes, and more specifically, it will most desirably be an azo or quinone dye.

Other objects of the invention are attained with a paste, comprising the dyestuff composition hereinabove described and water, the dyestuff comprising about 35-55 weight percent of the paste. A method of milling enables the attainment of certain additional objects of the invention, in accordance with which method the paste hereinabove described, is subjected to milling for a period of time sufficient to reduce the water-insoluble particles of the paste to a weight average particle size of about 50 to 200 angstroms.

The provision of a dye bath enables the attainment of yet further objects of the invention, which dye bath comprises an effective amount of a dyestuff composition, as hereinabove described, admixed with water. In the bath, the insoluble fraction of the dyestuff composition will have a weight average particle size of about 50 to 200 angstroms. Finally, yet further objects of the invention are attained in a method of dyeing, wherein a dye bath, as hereinbefore described, is heated to a temperature of about 70° to 135° Centigrade. A fabric is immersed in the bath for a period of time sufficient to effect dyeing thereof, which fabric is thereafter removed from the bath. In accordance with certain embodiments of the dyeing method, the dye employed will be soluble in the first bath and the method will include a step, effected subsequent to the initial removal step, of immersing the fabric in a second bath, to render the dye insoluble on the fabric.

DETAILED DESCRIPTION OF THE PREFERRED EMBODIMENTS

Exemplary of the efficacy of the present invention are the following examples, wherein all parts and percentages specified are on a weight basis.

EXAMPLE ONE

A softwood spent sulfite liquor was used, which contained (in percentages) about 63 sodium lignosulfonate (47 lignin, 5.5 organic sulfur, 7 methoxy groups, 3.5 sodium) and 20 reducing sugars, the remainder being inorganic salts, polysaccharides, and the like. The liquor was reacted with sodium hydroxide at a temperature of 90° Centigrade for a period of 2 hours to revert substantially all of the sugars contained in the liquor to sugar acids. The reverted liquor, which had a pH of 10.7, contained 1,140 parts solids and 1,285 parts water; of the solids content of the liquor, 400 parts comprised organic sugar acids and inorganic salts and 600 parts thereof comprised lignosulfonate. The lignosulfonate in the liquor was methylolated by reacting 1,000 parts of the reverted liquor solids with 60 parts of formaldehyde at a temperature of 70° Centigrade for 2½ hours; at the end of the reaction period, only trace amounts of residual formaldehye could be detected. Monohydroxyl benzyl alcohol was reacted with the methylolated lignosulfonate by introducing into the reaction mixture 1.9 millimoles of the monohydroxyl benzyl alcohol per gram of lignin in the lignosulfonate, the reaction therebetween being effected at 100° Centigrade for a period of 5 hours. The pH and viscosity of the final product solution were 10.95 and 43 centipoises at 25° Centigrade, respectively. The product was spray dried and evaluated as a dispersant, by utilizing it in the following test procedures.

Heat Stability

The heat stability of the dispersant was evaluated by first milling 10 grams of it with 40 grams of Disperse Blue 3 dye in a sand mill containing sufficient water to provide a total weight of 250 grams in the mill. Utilizing 500 grams of standard sand, and milling at 2,000 revolutions per minute, the dye and dispersant were milled for a total of 5 hours, 50 additional grams of the dispersant having been added during the last half hour of the milling operation. During the course of milling, the pH of the mixture was maintained at a value of 8, by adding appropriate amounts of acetic acid.

To evaluate the lignin product as a wet composition, an aliquot of the dye paste prepared in the manner hereinabove described, and containing 3 grams of solids, was diluted to a total volume of 100 milliliters with distilled water, and heated to a temperature of 70° Centigrade. The mixture was stirred for a period of one minute and was vacuum filtered, using a standard water aspirator and a Buchner funnel, through a 15 centimeter #2 Whatman filter paper. The time required for filtration, and the weight of residue on the filter paper were noted.

The ability of the lignin product to function as a dry composition was evaluated by spray drying the paste produced in accordance with the foregoing procedure, with an inlet temperature of 127° Centigrade and an outlet temperature of 88° Centigrade being utilized for the spray drying operation. Two grams of the spray dried powder were then converted to a paste with 10 milliliters of distilled water, following which the volume was increased to 100 milliliters by the addition of an appropriate amount of water, at 70° Centigrade. The resultant mixture was stirred well for a period of one minute, and filtered through Whatman #2 filter paper, as describe above; the residue weight and filtration time were noted.

The boiling temperature stability of the product was determined by first producing a paste from 2 grams of the above-described spray-dried powder and 10 milliliters of water at a temperature of 70° Centigrade. A volume of 290 milliliters of water, at a temperature of about 70° Centigrade, was added to the resultant paste, and the mixture was boiled, with stirring, for a period of 15 minutes. The boiled mixture was then filtered through a cotton cloth, and the cloth was inspected to determine the weight of residue which remained thereon; the time required for filtration was also noted.

Set forth in Table One below are the data which were obtained in the foregoing evaluations, utilizing the product prepared as described hereinabove. For comparison, data obtained utilizing other available dispersing agents are also set forth. TAMOL SN is a synthetic naphthalene sulfonate dispersant commercially available from Rohm & Haas Chemical Company; UFOXANE is an ultrafiltered, desulfonated lignosulfonate commercially available from Borregaard A/B, a Norwegian company; REAX 85A is sulfonated Kraft lignin, available from Westvaco Corporation, and MARASPERSE 52CP is a lignosulfonate dispersant commercially available from American Can Company.

In the following Table (and in subsequent tables setting forth the same sort of data), solids are expressed in percentages, viscosities are in centipoises, filtration times are in seconds, and residues are in milligrams.

TABLE ONE

| Dispersant | Dye Paste Solids | Dye Paste Viscosity | 70° Wet Dispersion Filt. Time | 70° Wet Dispersion Residue | 70° Dry Dispersion Filt. Time | 70° Dry Dispersion Residue | 100° Boiling Stability Filt. Time | 100° Boiling Stability Residue |
|---|---|---|---|---|---|---|---|---|
| TAMOL SN | 33.4 | 119 | 14 | 1094 | 23 | 662 | 56 | 479 |
| MARASPERSE 52 CP | 33 | 95 | 7.9 | 205 | 6.5 | 134 | 550 | 860 |
| UFOXANE | 33.6 | 118 | 6.1 | 216 | 5.9 | 143 | 255 | 468 |
| REAX 85A | 34.7 | 340 | 8.9 | 200 | 7.3 | 128 | 960 | 70 |
| Example One | 33 | 110 | 7.5 | 179 | 5.5 | 118 | 24 | 5 |

As can be seen from the data reproduced hereinabove, the dispersing agent of the present invention exhibits better stability than do any of the prior art commercially available dispersing agents with which it was compared, annd this is true with respect (by and large) to filtration times, as well as with respect to the weight of residue which remains on the filter paper. These results are especially significant insofar as comparison is made with the REAX 85A dispersing agent, in view of the fact that it is a sulfonated lignin compound product, which products are regarded to exhibit outstanding high temperature properties, and are widely used for the reason. It is also noted that, in addition to the very significant heat stability which the dispersant of the present invention exhibits, the above data also indicate that it effects a desirable reduction in viscosity of the dye paste. Low viscosity is, of course, desirable from the standpoint of facilitating processing of the paste and permitting higher solids concentrations to be utilized and contained in the ultimate product.

Fiber Staining

To determine the staining tendency of the dispersant of the invention, in comparison with commercially available products, a bath was produced from each by dissolving 10 grams of the dispersing agent in 250 milliliters of tap water, the dispersion being neutralized with acetic acid. Five swatches each of cotton and of a polyester/cotton (65/35) blend are introduced into the solution being tested, previously heated to boiling, and remain immersed therein for a period of ten minutes. The bath is poured from the swatches, which are then squeezed by hand to remove residual liquid and are thereafter placed into a beaker. The swatches are rinsed with cold tap water for a period of 5 minutes, and finally are dried in air. The reflectance of each of the swatches is measured in accordance with standard procedures on a brightness meter, at 457 nm (nanometer units), and the percentage of staining is calculated in accordance with the following formula:

$$\% \text{ Staining} = [(R_o - R_i)/R_o] \times 100$$

In the formula Ri=reflectance of the fabric stained by the dispersant; Ro=reflectance of a blank swatch, i.e., one treated with a water bath in which no dispersing agent is included. The test results are set forth in Table Two, which follows:

TABLE TWO

| Dispersant | Cotton | | Polyester Cotton Blend | |
|---|---|---|---|---|
| | $R_i$ | % Staining | $R_i$ | % Staining |
| Example One | 79.9 | 9.2 | 86.0 | 6.9 |
| MARASPERSE 52CP | 58.8 | 33.0 | 67.1 | 27.4 |
| UFOXANE | 54.2 | 38.3 | 65.6 | 29.0 |
| REAX 85A | 54.0 | 38.5 | 60.9 | 34.1 |
| TAMOL SN | 86.0 | 2.0 | 92.4 | 0 |
| Blank | 87.8 | 0 | 92.4 | 0 |

As can be seen from the data reproduced hereinabove, the dispersing agent of the present invention is far superior, in terms of its tendency to stain both cotton and also the cotton/polyester blend fabrics, as compared to all dispersing agents other then the TAMOL SN. That product is not, of course, a lignin-based dispersing agent, and it is used commercially largely because of its especially desirable staining characteristics; it is typically colorless, or virtually so.

Foaming Tendency

To evaluate the tendency of the present dispersing agent to stabilize foam, in comparison with that exhibited by other typical dispersing agents, one gram of the dispersant (on a solids basis) is dissolved in 100 milliliters of tap water, the pH of which is adjusted to 5 with acetic acid. The solution is introduced into a 250 milliliter graduated cylinder, which is rapidly inverted five times in succession; thereafter, the height of the foam (in milliliters) on the surface of the liquid is measured. It is measured a second time, following a one minute rest period, and again following a two minute period. The results of the test are set forth in Table Three below, from which it can be seen that the lignin dispersant of the present invention exhibits very desirable foaming characteristics, albeit that it does not outperform all of the other dispersing agents, in this instance.

TABLE THREE

| Dispersant | Foam Height | | |
|---|---|---|---|
| | Initial | 1 min. | 2 min. |
| MARASPERSE 52CP | 48 | 18 | 8 |
| UFOXANE | 35 | (breaks in 15 seconds) | |
| REAX 85A | 71 | 56 | 51 |
| Example One | 36 | 13 | 8 |

Azo Dye Reduction

To test azo dye reduction, 100 milligrams of Disperse Brown 1 dye is dispersed in 200 milliliters of distilled water with either one or two grams of the dispersing agent to be evaluated. Five swatches of cotton cloth are introduced into the dispersion, which is heated to 135° Centigrade and maintained at that temperature for a period of 1½ hours. The percentage of dye reduction is then calculated from reflectance values exhibited by the swatches, as determined by standard procedures. The dye reduction tendencies of the several dispersing agents are reproduced in Table Four below, from which it can be seen that the lignin dispersant of the present invention outperformed all of the others with which it was compared. The results are especially notable with respect to the MARASPERSE and UFOXANE products, in view of the fact that they, like the dispersing agent of the invention, are lignosulfonates.

TABLE FOUR

| | Percent Dye Reduction | |
|---|---|---|
| Dispersant | 1 gram | 2 gram |
| MARSPERSE 52CP | 51.8 | not determined |
| UFOXANE | 58.1 | not determined |
| REAX 85A | 56.6 | 85 |
| Example One | 27.3 | 42.3 |

EXAMPLE TWO

A softwood lignosulfonate liquor similar to that of the foregoing Example, but from a different source and containing a higher concentration of lignosulfonate was reacted with monohydroxyl benzyl alcohol in the same manner as described in therein. The product was evaluated for its milling efficiency, as compared to other available products, by milling, for varying periods of time, dye pastes (40 percent solids) made of a selected dye and the dispersant in a 3:1 ratio, and using sand in a ratio of about 3:1 to the solids of the paste. A one gram aliquot of the dye paste was diluted to 200 milliliters with distilled water, and the mixture was vacuum filtered through a Buchner funnel containing #2 and #4 Whatman filter paper (i.e., in a typical "2 by 4" test). Filtration time and filter residue weight were noted.

In comparison to the same commercial dispersants used in Example One, the dispersant of this Example was invariably superior in milling efficiency. Using a low energy dye (Disperse Yellow 54), the dispersant of the Example, milled for 60 minutes, produced a residue of about 30 milligrams; after the same milling time, the residue weights (in milligrams) were about 80 with TAMOL SN, 120 with MARASPERSE 52 CP and 210 with the REAX 85A. Using, on the other hand, a high energy dye (Desperse Blue 79), again after a 60 minute milling period, the instant dispersant produced a residue of 20 milligrams; REAX 85A, MARASPERSE 52 CP and TAMOL SN produced, respectivey, residues of about 70, 80 and 170 milligrams. The same relative positions of the products, in terms of efficiency, were maintained at higher periods of milling. These data show not only the superiority of the dispersant of the present invention, in absolute terms of milling efficiency, but also its broad range of effectiveness with dyes at opposite ends of the energy spectrum, as contrasted with the conventional dispersing agents.

After 60 minutes of milling, the UFOXANE dispersant exhibited an efficiency comparable to that of the invention. However, using Disperse Yellow 54 for example, after 90 minutes of milling the residues produced with UFOXANE and the instant dispersant were 40 and 29 milligrams, respectively; after 120 minutes, they were 47 an 27, respectively. The same trends were found to occur with the Blue 79 dye. Moreover, the despersant of the invention exhibits much better viscosities in dye pastes. Using a 40% solids paste with Blue 79, for example, its value was 257 centipoises at 25° Centigrade, as compared to 824 for UFOXANE.

EXAMPLE THREE

A lignosulfonate, available commercially from American Can Company under the trademrk NORLIG 42, was treated with a monohydroxyl benzyl alcohol. as in Example One, and the resultant adduct was evaluated for heat stability with Disperse Blue 3. in the manner therein described. From the following table, which presents data using both the modified lignosulfonate and also the unmodified starting material, it is evident that the modification significantly enhances the heat stability of the material. Upon testing, the modified product is also found to exhibit good staining, azo dye reduction, foaming and milling characteristics.

TABLE FIVE

| Dispersant | Dye Paste Solids | Dye Paste Viscosity | 70° Wet Dispersion Filt. Time | 70° Wet Dispersion Residue | 70° Dry Dispersion Filt. Time | 70° Dry Dispersion Residue | 100° Boiling Stability Filt. Time | 100° Boiling Stability Residue |
|---|---|---|---|---|---|---|---|---|
| Example One | 35 | 160 | 18.0 | 1387 | 29 | 498 | — | — |
| Example Three | 33.8 | 182 | 7.8 | 218 | 7.3 | 152 | 17.7 | 70 |

EXAMPLE FOUR

REAX 85A (sulfonted Kraft lignin) was dissolved in water to make a 30 percent solution, and was heated for 5 hours with about 18.5 parts, per 100 parts of lignin, of monohydroxyl benzyl alcohol at a temperature of 100° Centigrade; the initial and final pH of the reaction solution were 11 and 11.4, respectively. The product was spray dried and evaluated for heat stability, as in Example One. The data in the Table which follows show that the reaction with the monohydroxyl benzyl alcohol significantly improved the heat stability of the starting material, albeit with an increase in the viscosity of the dye paste. Upon testing, the staining, azo dye reduction, foaming and milling characteristics of the reaction products are all found to be satisfactory.

TABLE SIX

| Dispersant | Dye Paste Solids | Dye Paste Viscosity | 70° Wet Dispersion Filt. Time | 70° Wet Dispersion Residue | 70° Dry Dispersion Filt. Time | 70° Dry Dispersion Residue | 100° Boiling Stability Filt. Time | 100° Boiling Stability Residue |
|---|---|---|---|---|---|---|---|---|
| REAX 85A | 34 | 340 | 8.9 | 200 | 7.3 | 128 | 960 | 70 |
| Example Four | 30 | 1770 | 7.5 | 183 | 7.3 | 108 | 17 | 45 |

EXAMPLE FIVE

To demonstrate the effect of the hydroxymethyl groups of the hydroxyl benzyl alcohol in the production of the products of the invention, an adduct excluding such groups was made by reacting methylolated lignosulfonate with 1.5 millimoles of phenol in the manner described in Example One. The prodct was evaluated with Disperse Blue 102 by sand milling 33 grams of the dye, 25 grams of the adduct, 250 grams of standard sand and 242 grams of water, at a pH of 6.5-7.5, for 3 hours. The dye paste, after viscosity measurement, was placed into a 9×12 inch glass drying tray and dried overnight in a 50°-60° Centigrade forced air oven. The dried mix was pulverized through a 0.027 screen on a micropulverizer, and 0.87 gram of the pulverized dye was blended with 2.13 grams of anhydrous sodium sulfate (standardized dye). The blended dye was pasted well with 5 milliliters of tap water at 65°-70° Centigrade to produce a smooth slurry, after which 95 additional milliliters of tap water at the same temperature was added. The dye solution was heated to 70° Centigrade and filtered through a 9 centimeter No. 230 Reeve-Angel filter paper, using a Buchner funnel. Filtration time and residue weight on the filter paper were recorded.

To test for 100° Centigrade heat stability (boil test), the standardized dye, produced as above, was mixed into 100 milliliters of tap water and heated with a live steam to a moderate boil. After 5 minutes, the dye solution was filtered through Reeve-Angle No. 230 filter paper, and the residue weight was determined. To determine 135° Centigrade heat stability (bomb test), 230 milliliters of distilled water was placed in a brass bomb with 0.6 gram of the pulverized dye. The contents of the bomb were heated to 90° Centigrade with constant stirring and, after securely fastening the top, the bomb was heated in an oven at 135° Centigrade for 1½ hours. After cooling to room temperature, the dye solution was reheated to 80°-85° Centigrade, and poured on Reeve-Angel No. 230 filter paper and residue weight again determined. The results are set forth in Table Seven, which follows.

TABLE SEVEN

| Dispersant | Dye Paste Solids | Dye Paste Viscosity | 70° C. Filt. Time | 70° C. Residue | 100° C. Residue | 135° C. Residue |
|---|---|---|---|---|---|---|
| MARASPERSE 52CP | 18.2 | 41 | 2.5 | 58 | 50 | 19 |
| UFOXANE | 18.2 | 46.8 | 3.0 | 50 | 44 | 14 |
| REAX 85A | 18.2 | 41 | 2.5 | 58 | 51 | 17 |
| Example One | 18.3 | 26.4 | 2.3 | 47 | 41 | 11 |
| Example Five | 16.4 | 33.6 | 3.3 | 360 | 358 | 55 |

EXAMPLE SIX

A sugar-reverted softwood spent sulfite liquor, without methylolation, was treated with monohydroxyl benzyl alcohol in the same manner as Example One. The product was evaluated with Disperse Blue 102 according to the procedure outlined in Example Five, and was compared with the product of Example One. The results are set forth in Table Eight, which follows.

TABLE EIGHT

| Dispersant | Dye Paste | | 70° C. | | 100° C. Residue | 135° C. Residue |
|---|---|---|---|---|---|---|
| | Solids | Viscosity | Filt. Time | Residue | | |
| Example One | 18.3 | 26.4 | 2.3 | 47 | 41 | 11 |
| Example Six | 17.5 | 22.4 | 2.0 | 35 | 39 | 5.9 |

From the foregoing data, it is seen that an entirely satisfactory product is produced without methylolation of the lignosulfonate. However, upon inspection of the filter paper, it is found that, in some instances, specking occurred using the unmodified lignosulfonate dispersant. This is indicative of some nonuniformity in the particles of dye, the avoidance of which represents a principal advantage of methylolation.

EXAMPLE SEVEN

Reaction with various amounts of dihydroxyl benzyl alcohol was effected at 100° Centigrade at selected pH values and for different time periods, with a methylolated, unfractionated spent sulfite liquor (30% solids). The resultant products were evaluated for heat stability with Disperse Blue 102, in the manner described in Example Five. The results, as evidenced by the data set forth in the following table, show the effectiveness of the dihydroxyl benzyl alcohol modification in producing dispersing agents. The amount of the benzyl alcohol compound used ("Dosage") is expressed in millimoles per gram of lignin moiety present; the reaction time is expressed in hours. Upon testing, the proudcts are found to have satisfactory azo dye reduction, staining, foaming and milling characteristics. It is also noted that less of the dihydroxyl benzyl alcohol is used than is the monohydroxyl compound, on a molar basis, to achieve comparable results.

TABLE NINE

| Dispersant | | | Dye Paste | | 70° C. | | 100° C. Residue | 135° C. Residue |
|---|---|---|---|---|---|---|---|---|
| Dosage | Reaction Time | pH | Solids | Viscosity | Filt. Time | Residue | | |
| 0 | — | | 17.8 | 62.6 | 3.0 | 122 | 410 | 45 |
| 0.025 | 9.8 | 2 | 18.5 | 63 | 2.3 | 41 | 46 | 31 |
| 0.025 | 7.0 | 5 | 18.5 | 21 | 2.6 | 12 | 37 | 15 |
| 0.05 | 7.0 | 5 | 18.5 | 29 | 2.7 | 11 | 39 | 12 |

EXAMPLES EIGHT, NINE AND TEN

EIGHT

A trihydroxyl benzyl alcohol, prepared by heating equimolar amounts of pyrogallol with formaldehyde at a pH of 11 and a temperature of 50° Centigrade for 30 minutes, was reacted with methylolated lignosulfonate at 100° Centigrade and a pH of 7 for 5 hours. The ratio of the benzyl alcohol to lignosulfonate was 0.9 millimole per gram of lignin contained therein, the pH and solids concentrations in the product mixture were 7.5 and 30 percent, respectively, and the product solution had a viscosity of 67 centipoises.

NINE

An alkyl substituted monohydroxyl benzyl alcohol was synthesized by reacting equimolar amounts of paracresol with formaldehyde at 70° Centigrade and at a pH of 11 for one hour. Methylolated lignosulfonate solids were reacted at 100° Centrigrade with the foregoing benzyl alcohol for 5 hours, at a pH of 7.0. The benzyl alcohol was present in the reaction mixture at a concentration of 0.9 millimole per gram of lignin in the lignosulfonate; the pH, percent solids and viscosity of the product solution were 7.8, 32 percent and 74 centipoises, respectively.

TEN

An hydroxymethyl monohydroxyl benzyl alcohol was prepared by reacting of phenol and formaldehyde (in a 1:2 molar ratio) at a pH of 11 and 70° Centigrade for 2 hours. The resultant product was reacted at 100° Centigrade with sodium lignosulfonate (34 percent solids) at a pH of 10 for 5 hours. The benzyl alcohol was present in the reaction mixture at an initial concentration of 1.8 millimoles per gram of lignin in the lignosulfonate present; the pH, solids and viscosity of the end product were 10.4, 34 percent and 370 centipoises, respectively.

In Table Ten below, the heat stability data for the products of Examples Eight, Nine and Ten are set forth. In addition, each of the products is found to exhibit desirable azo dye reduction, staining, foaming and milling characteristics, when employed as a dye dispersant.

TABLE TEN

| Dispersant | Dye Paste | | 70° C. | | 100° C. Residue | 135° C. Residue |
|---|---|---|---|---|---|---|
| | Solids | Viscosity | Filt. Time | Residue | | |
| Example Eight | 17.9 | 76 | 2.5 | 110 | 101 | — |
| Example Nine | 18.4 | 59 | 2.4 | 51 | 46 | 37 |
| Example Ten | 18 | 46 | 2.1 | 39 | 36 | 10 |

While other mechanisms, undoubtedly including polymerization reactions, are also involved, the principal reaction between the sulfonated lignin compound and the hydroxyl benzyl alcohol compound is believed to be one of condensation occuring at the hydroxymethyl group of the hydroxyl benzyl alcohol compound and the guiaiacyl moiety of the lignin. As has been indicated hereinabove, the reaction will generally be effected in a period of about 1 to 24 hours, with 4 to 8 hours generally being found to be optimal. If the reaction time is excessive, the product solution and dye paste viscosities will be excessive; undesirably low conversions will, of course, be the principal consequence of inadequate reaction periods. Temperatures in the range of about 50° to 100° Centigrade will normally be employed, with a temperature of about 80° Centigrade or above being generally preferred. An excessively high temperature will cause discoloration and consequential staining; a temperature that is too low will dictate the use of a reaction period that is impractically long in duration.

Although it is feasible to carry out the reaction between the sulfonated lignin compound and the hydroxyl benzyl alcohol compound at a pH within the broad range of 3 to 12, preferably the pH will be at least 5, and most desirably it will have a value of at least 10. While the heat stability of the adduct will usually be best if the pH of the reaction mixture is maintained at 10 or above, and the foam stabilizing characteristics of the adduct have been found to be lowest at a value of 10.4 (using monohydroxyl benzyl alcohol as the benzyl alcohol); staining again may become excessive if the pH is too high. From a practical and economic standpoint, the reaction will generally be effected at ambient pressure, since doing otherwise will require pressure vessels and will complicate the process. However, if desired, elevated pressures may be employed, and may advantageously increase the reaction rate.

Insofar as the reactants are concerned, it will be appreciated by those skilled in the art that the precise specification of proportions is virtually impossible, due not only to the wide variation that is possible in the nature of the sulfonated lignin compounds that are suitable for use herein, but also because, even with respect to the most definable compound (i.e., lignin, per se), there is serious dispute as to molecular structure and molecular weight. Hence, the amounts of the modifying reactants used in the reaction are stated herein in units of mole per gram of lignin, ignoring not only the levels of sulfonation and/or methylolation that the molecule may contain, but also the presence of other constituents of the sort typically found in spent sulfite and black liquors, such as reverted and unreverted sugars, inorganic salts, sulfonated constituents, and the like. Nevertheless, those skilled in the art will appreciate that deviations from the ratios specified will be common, and that the expression of such ratios is for the purpose of guidance, and need not be strictly adhered to in the practice of this invention.

Regarding the paper pulping liquors, it has hereinabove been pointed out that spent sulfite liquor may be employed, as such, in the reactions of the invention, it may be modified (such as by desugaring with sodium hydroxide, by methylolation with formaldehyde, by sulfonation and/or sulfoalkylation with suitable sulfite or bisulfite compounds), and/or it may be fractionated to remove certain constituents or to recover the lignosulfonate (which may itself be purified or concentrated). It may be necessary to adjust the amounts of reactants used to produce the adducts of the invention, depending upon the presence of other reactive constituents; however, such adjustments will also be evident to, and readily made by, those skilled in the art.

Particular mention may be made of the sugars contained in spent sulfite liquors, which (together with the inorganic salts) may comprise up to about 50 percent of the liquor solids. Since they tend to reduce azo dyes rather effectively, it is often important to revert them to the corresponding acid. Also, with respect to sulfonation, it will be appreciated that a range of 2 to 8 percent (of organic sulfur, based upon lignin) has been indicated herein, to encompass the level of sulfonic acid groups (expressed as sulfur) normally and inherently contained in the lignosulfonate of spent sulfite liquor (i.e., 4 to 8 percent), as well as the level which will usually be introduced into lignin to render it effective for use herein (i.e., 2 to 7 percent).

While monohydoxyl benzyl alcohol has been emphasized, use of the polyhydroxyl benzyl alcohols may offer significant advantages, from the standpoint of minimizing the amount of the alcohol reactant necessary to produce effective dispersants. For example, whereas as little as 0.05 millimole of the dihydroxyl derivative per gram of lignin may be used (0.1 millimole per gram being preferred in some instances), the minimum concentration of the monohydroxyl compound will normally be about 0.5 millimole per gram. This saving may be offset, however (to a greater or lesser degree), by the higher cost of producing the polyhydroxyl compounds. While the way in which any of the benzyl alcohol compounds are made may produce some superficial differences (such as in their pH values), any such differences are readily adjusted or compensated for. Accordingly, it is not necessary to provide any further description of the processes of manufacture, beyond those that have already been furnished. Finally, the dyes employed in the foregoing specific examples are standard commerical products, which conform to the specifictions applicable to dyes identified under the Color Index names that are set forth.

Thus, it can be seen that the present invention provides novel dispersants produced from sulfonated lignin materials, which dispersants may exhibit an optimal balance of properties, rendering them highly suited for use for disperse and vat dyestuffs. The invention may provide sulfonated lignin dispersants which exhibit relatively low staining and azo dye reducing properties, as well as lignosulfonate dispersants exhibiting greatly imroved levels of heat stability. Moreover, the products of the invention afford superior milling efficiency, as compared to similar dispersants of the prior art, and they are relatively inexpensive and simple to produce. In addition, the invention provides novel dyestuff compositions, pastes, and dye baths, as well as methods for their utilization.

Having thus described the invention, what is claimed is:

1. A dyestuff composition comprising a water-insoluble dye; and a lignin adduct of a methylolated derivative of a sulfonated lignin material containing about 2 to 8 percent by weight of combined organic sulfur, and about 0.05 to 4.0 millimoles, per gram of the lignin moiety of said material, of an hydroxyl benzyl alcohol compound having the general formula:

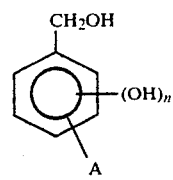

wherein n is an integer from 1 to 3 and A is a substituent selected from the group consisting of hydrogen, alkyl groups containing 1–4 carbon atoms and the hydroxymethyl group, said adduct being present in a weight ratio to said dye of from about 0.25 to 0.75:1.0.

2. The composition of claim 1 wherein said dye is selected from the group consisting of disperse and vat dyes.

3. The composition of claim 2 wherein said dye is a quinone or an azo dye.

4. A dye paste comprising the dyestuff composition of claim 1 and water, said dyestuff composition comprising about 35 to 55 weight percent of said paste.

5. In a method of milling a dye the steps comprising:
   forming dye paste of claim 4; and
   milling said paste for a period of time sufficient to reduce the water-insoluble particles thereof to a weight average particle size of about 50 to 200 angstroms.

6. A dye bath comprising an effective amount of a dyestuff composition of claim 1 admixed with water, the insoluble fraction of said dyestuff composition having a weight average particle size of about 50 to 200 angstroms.

7. In a method of dyeing a fabric, the steps comprising:

a. forming a dye bath by admixing with water an effective amount of a dyestuff composition, said composition comprising: (1) a water-insoluble dye, and (2) a lignin adduct of a methylolated derivative of a sulfonated lignin material containing about 2 to 8 percent by weight of combined organic sulfur, and about 0.05 to 4.0 millimoles, per gram of the lignin moiety of said material, of an hydroxyl benzyl alcohol compound having the general formula:

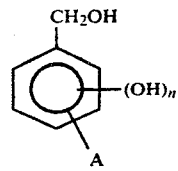

wherein n is an integer from 1 to 3 and A is a substituent selected from the group consisting of hydrogen, alkyl groups containing 1-4 carbon atoms, and the hydroxymethyl group, said adduct being present in a weight ratio to said dye of from about 0.25 to 0.75:1.0, and the insoluble fraction of said dyestuff composition having a weight average particle size of about 50 to 200 angstroms;

b. heating said bath to a temperature of about 75° to 135° Centigrade;

c. immersing a fabric in said bath for a period of time sufficient to effect dyeing thereof; and d. removing said fabric from said bath.

8. The method of claim 7 wherein said dye is soluble in said first-mentioned bath, and wherein, subsequent to said removal step, said fabric is immersed in a second bath to render said dye insoluble.

* * * * *